Mar. 20, 1923.
R. P. PESCARA
1,449,129
SCREW PROPELLER OF HELICOPTER FLYING MACHINES
Filed July 17, 1920      2 sheets-sheet 1
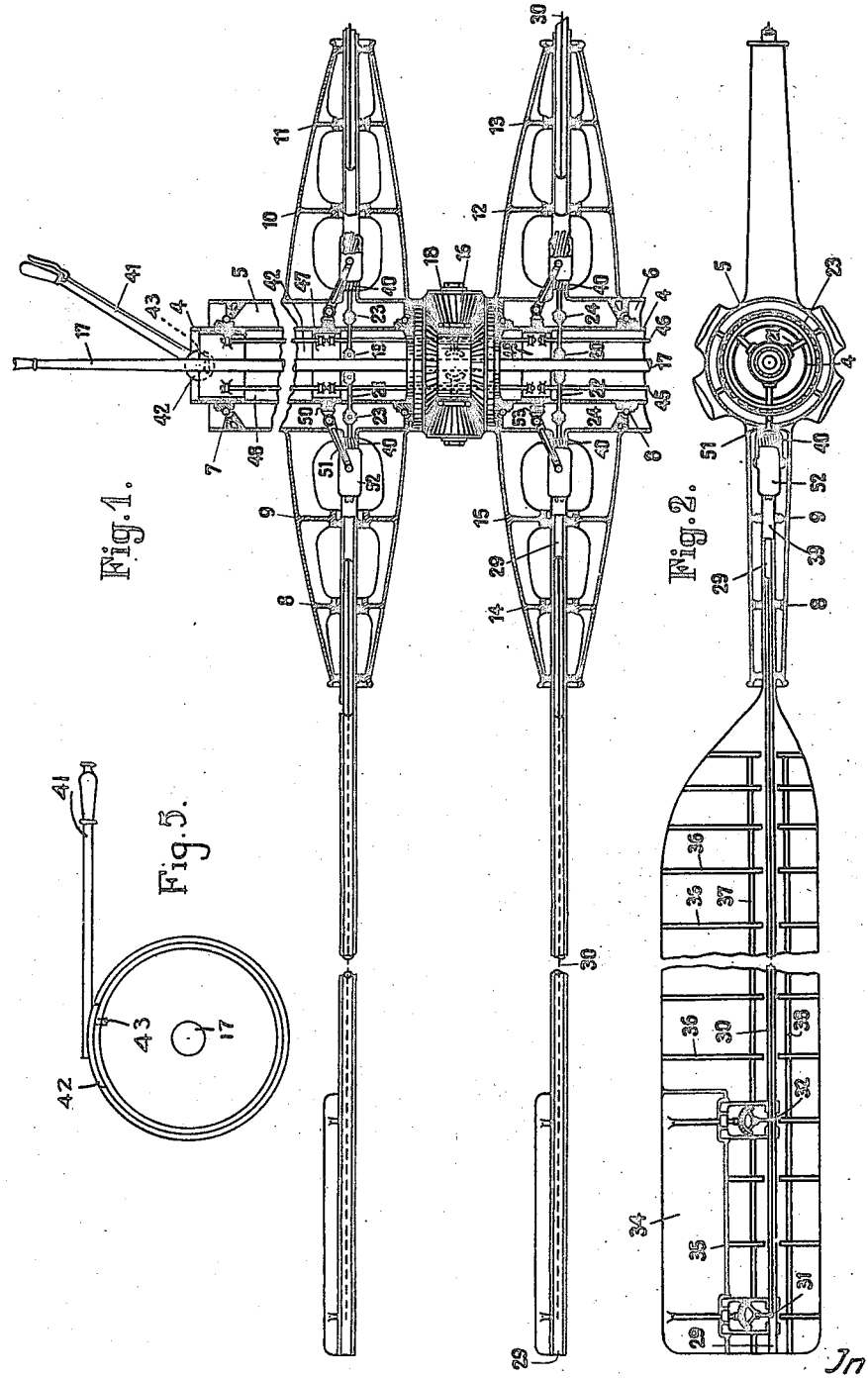
Inventor:
R. P. Pescara
By H. R. Kerslake
Attorney Mar. 20, 1923.

R. P. PESCARA 1,449,129

SCREW PROPELLER OF HELICOPTER FLYING MACHINES

Filed July 17, 1920     2 sheets-sheet 2

Inventor:
R. P. Pescara
By H. R. Herelake
Attorney

Patented Mar. 20, 1923.

1,449,129

UNITED STATES PATENT OFFICE.

RAUL PATERAS PESCARA, OF BARCELONA, SPAIN.

SCREW PROPELLER OF HELICOPTER FLYING MACHINES.

Application filed July 17, 1920. Serial No. 397,103.

*To all whom it may concern:*

Be it known that I, RAUL PATERAS PESCARA, a citizen of the Argentine Republic, residing at Barcelona, Spain, Calle de la Buena Suerte No. 20, have made certain new and useful Improvements in or Relating to the Screw Propellers of Helicopter Flying Machines (for which I have filed application in Spain, July 3, 1919), of which the following is a specification.

In matters concerning helicopter flying machines it is to be understood that hereinafter the expression "screw propeller" is used to denote any device adapted to exert a pressure along an axis as the result of the rotational motion of surfaces constructed with or without a helical twist.

The simplest solution of the general problem of the steering, propulsion and stabilizing of flying machines of the helicopter type, may be considered to be constituted by the provision of a system of two screw propellers revolving in opposite directions and capable of being inclined in any direction relatively to the vertical.

Notwithstanding that theoretical solution of the problem, it is nevertheless not easy to provide a practical solution of the said problem owing to all the complications entailed by the execution of the inclining of the apparatus.

Moreover, if it be taken into consideration that in the case of an accidental stoppage of the engine or engines of an helicopter flying machine, the descent under the action of gravity would become increasingly accelerated in such a manner as to become very dangerous, difficulties are encountered which are not calculated to encourage study and investigation relating to machines of that type.

The parachute screw propellers for flying machines of the helicopter type capable of being steered, propelled and stabilized by inclination in any direction, that form the subject matter of the present invention, are designed by their action alone, to provide a practical solution of the four problems of:—steering, propulsion, stabilization, and slow descent without engine power by employing:— differential periodical warping; differential periodically variable incidence, the simultaneous diminution of incidence of their blades.

By the expression "warping screw propellers" are to be understood screw propellers provided with a mechanical device that allows of warping their blades, that is to say, of partially changing their angle of attack in such a manner that this variation shall affect only a more or less extensive portion of the surfaces by which it is constituted. The warping will be differential if, to an increase of incidence in a blade, there corresponds at the same moment a diminution in the opposite blade. Further the said variation will be designated hereinafter as being differential and periodic, when the differential variation of the angle of attack is reproduced periodically at each revolution of the blades.

The same definitions are to apply to the differential periodically variable variation of incidence with the only difference that the above mentioned variations of the angle of attack affect the whole of the surfaces that constitute the blades.

Finally, the expression "screw propellers with simultaneous diminution of incidence" is intended hereinafter to designate screw propellers constructed in such a manner that the incidence of their blades can be diminished or increased during flight, the diminution or increase effected at a given instant being equal for all the blades of the screw propeller under consideration.

It is hereinafter explained how the use of these devices allows of solving the hereinbefore stated problems.

First however I will proceed to point out the analogy existing between the variable periodical warping and the periodically variable variation in the incidence. From their definitions it is seen that the warping which affects only a generally small portion of the surfaces constituting the blades, allows of obtaining efforts that are much more graduated in intensity than the variation in the incidence. I shall consider it therefore as being an improvement on the variable incidence and, finally, I shall discuss the possibility of employing them in one of the three following ways:—

1. Variable incidence alone,
2. Warping alone,
3. Combination of warping and differential variable incidence.

But since the reasoning that can be employed, is the same for the warping and the variation in the incidence, only the warping will be dealt with hereinafter for the sake of simplicity. From now onwards, all that is stated herein is intended to apply to both.

Fig. 4 is a plan of a screw propeller of this kind.

On applying the differential periodical warping in such a manner that the minimum angle of attack shall be situated at A and the maximum angle of attack shall be situated at B, it will be perceived immediately that the region marked $a$ will give less thrust than the region $b$, and consequently the machine will have a tendency to become inclined. It has already been stated hereinbefore that this inclination allows of solving the problems of propulsion, steering and stabilization in any azimuth X X.

It will now be set forth how the simultaneous diminution of incidence allows of obtaining a slow descent without consumption of engine power, that is to say, what is hereinafter designated as a "direct rotary downward glide" ("vol plane"). Under this designation is to be understood the descending movement of a helicopter flying machine retarded by the thrust due to the direct idle rotation of the blades of its screw propellers.

In order that this idle rotation shall be effective, it is necessary that it shall take place in accordance with a law corresponding to an angle of attack such that the ratio between the resistance and the thrust shall be the minimum or in the neighborhood of the minimum that can be obtained with the profile adopted for the blades. In order that this law shall operate the blades must retain their normal speed of rotation by instantaneous diminution of their angle of attack before the velocity of the fall becomes too accelerated.

This diminution of the incidence in all the blades corresponds to the definition hereinbefore given of the simultaneous diminution of incidence. The later thus certainly allows of executing a direct rotary downward glide.

I shall now proceed to describe a mechanical arrangement by means of which it is possible to control the warping and the diminution of incidence. For the sake of greater clearness I shall divide this description into three parts:—

1. The devices which produce warping effects by their direct action upon the air. To such devices I will give the generic name of warping devices.

2. The mechanism for controlling the warping devices.

3. The constructional arrangement of a screw propeller blade, for allowing the simultaneous diminution of incidence and the control of the latter.

1. Warping devices:

It must be remembered that by this designation I denote any device which, by its direct action upon the air, allows of varying the angle of attack or of varying the thrust of a restricted portion of the blade of a screw propeller.

Since this arrangement may be carried into execution in several equivalent ways, I will mention by way of example the following method of execution:—

An aileron (auxiliary plane) capable of horizontal deviation in each or only in some of the blades, said aileron being formed by cutting the actual blade.

It being impossible to give a description of every imaginable system, I shall take as a type, that of an aileron capable of horizontal deviation, formed by cutting the actual blade, and capable of movement around an axle marked 35 in Fig. 2 of the accompanying drawings.

2. Mechanisms for controlling the warping devices.

Fig. 1 is a vertical section, and

Fig. 2 is a plan of the general arrangement of the screw propellers.

Fig. 5 is a partial plan indicating the working of the control levers.

Figure 4:
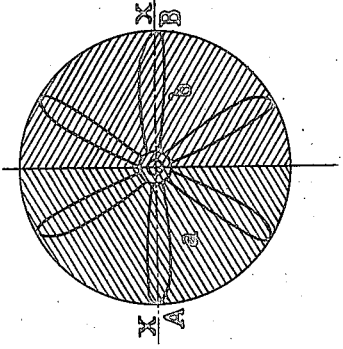
Figure 4 is a plan view of one of the propellers.

The central tube 4 serves as an axle for the bosses 5 and 6 of the screw propellers by means of ball bearings such as 7 and 8. In front of each blade these bosses 5 and 6 are provided with arms carrying various supports 8, 9, 10, 11, 12, 13, 14, 15. 16 are the bevel toothed wheels by which the two screw propellers are coupled together.

The pilot controls the warping by means of the stick 17 that is movable in all directions around a ball and socket joint 18 fixed to the central tube 4.

The parts marked 19 and 20 are ball joints fixed to the stick 17, whose outer rings support arms 21 and 22 that extend through the central tube and are fixed in the inner ring of the large ball bearing 23, 24 outside the central tube.

Figure 3:
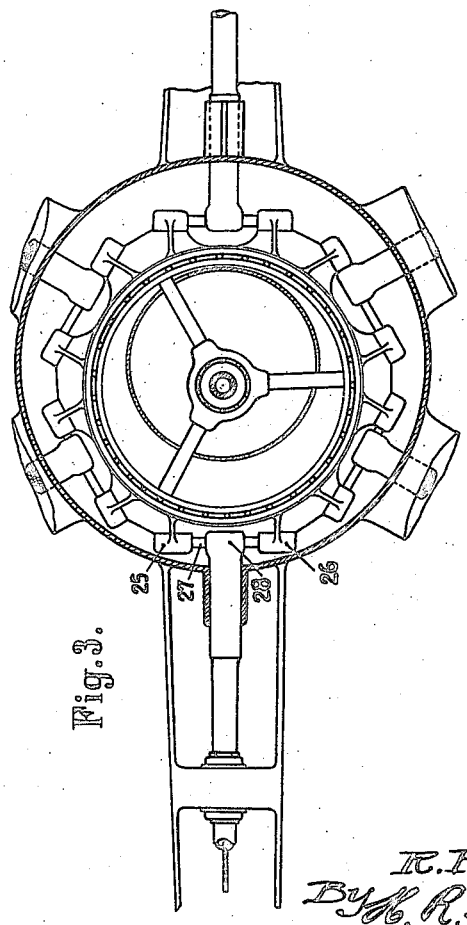
Figure 3 is a plan view partly in section of a portion of the apparatus.

The outer ring of this bearing 23 has, in front of each blade, the form of a fork whose prongs terminate in two cylinders such as 25 and 26 in Fig. 3 which is a plan of the apparatus on a large scale.

In these cylinders there is adapted to slide a rod 27 which is rigidly connected to a part 28 inside the fixed longitudinal 29 of the blades, and in which it is only capable of sliding by means of straight grooves which guide it.

A cable 30 is attached at one end to the part 28, and is connected at its other end to two worm gear segments 31 and 32 which, by their motion, cause the aileron 34 to turn around its axle 35. From Fig. 3 it will be easy to understand the manner of operation of this arrangement. When the pilot moves the stick 17 over in a certain direction, the ball bearing 23 of the upper screw propeller assumes the position shown in Fig. 3. Thereupon the cables attached to the parts 28 are pulled. Since the centrifugal action of the screw propeller in rotating, has a constant tendency to maintain the pull in these cables, one of the ailerons will have to turn in a certain direction whereas the aileron of the opposite blade will have to turn in the reverse direction. In this manner the differential warping is effected.

The same apparatus acts similarly in the other screw propeller so as to produce an identically simliar effect.

3. Constructional arrangement of the blade and control of the simultaneous diminution of the incidence.

The blade is constructed (Figs. 1 and 2) like the wing of an aeroplane. 36 are various ribs that maintain the adopted profile. 37 and 38 are two wooden longitudinals that couple them together.

The ribs comprise in the longitudinal axis of the blade, a hole fitted with a ring of bronze which allows of the passage of a tubular steel longitudinal 29 rotatably carried in the supports 8 and 9, The blade is consequently movable as a whole on said axle 29. It terminates in a tube 39 formed on its outside with a very slow pitched screwthread 40.

The control of the movement for reducing the incidence, which after all reduces itself, to a rotary movement of the blade around the axle 29, is effected by means of the lever 41. The said lever 41 comprises a circular disc-like portion 42 which is rotatably mounted within the central tube 4 as diagrammatically indicated in Figs. 1 and 5. On said disc-like portion 42 there is secured a circular stud 43 which engages in a suitable horizontal slot in the guide 48. Guides 47 and 49 are connected by rods 45, 46 with the guide 48 so that all the guides move up and down together within the central tube 4, while said guides are also provided with means to prevent their rotation within the tube 4.

The guide 47 has lugs that extend through the central tube by way of slots. These lugs support a ball bearing 50 the outer ring of which carries opposite each blade a link 51 jointed at one end in the said ring, and at its other end in a part 52 that constitutes the nut for the screwthread 40.

It will be readily understood that on operating the lever 41, these links will compel the nut 52 to move for instance towards the axis of the screw propeller. Consequently, since this part 52 is unable to execute any rotary motion by reason of the link 51 which holds it fast, the blade will be compelled to turn around its axis constituted by the longitudinal 29. In this manner the incidence is reduced in all the blades, if the directions of the screwthreads have been suitably selected.

It is to be noted that the rotary motion of the screw propeller does not hinder the working of these mechanisms, owing to the provision of ball bearings such as 23, 24, 50 and 53.

What I claim is:—

1. An improved screw propeller for flying machines of the helicopter type including a number of blades, means for angularly displacing said blades about their longitudinal axes, and means for periodically distorting said blades as the propeller rotates so as to produce substantially a periodically varying warping effect.

2. A propeller of the kind defined by claim 1 in which the means for distorting the blades includes ailerons, and means for operating said ailerons.

3. A propeller of the kind defined by claim 1 in which the means for turning the blades about their longitudial axes includes rotatable shafts extending through the blades, and means for turning said shafts.

4. In combination, an axle, a propeller hub rotatably mounted on said axle, a series of radial shafts carried by said hub, a propeller blade carried by each of said shafts, screw threads provided upon each of said shafts, non-rotatable nuts engaging said screw threads, an antifriction bearing mounted on said axle, links connecting said bearing to said nuts, and means for shifting said bearing longitudinally of said axle to cause shifting of said nuts and rotation of said shafts.

5. A combination of the kind defined by claim 4 in which the means for shifting said bearing includes an axially movable sleeve, and means for actuating said sleeve.

6. In combination, a hollow axle, an antifriction bearing mounted within said axle and having arms extending through the axle, a second antifriction bearing arranged exteriorly of the axle and connected to said arms, means for shifting the first mentioned antifriction bearing toward and away from the axis of said axle, tubular supporting members carried by said axle, blades mounted upon said supporting members, an aileron mounted upon each blade, and controlling means for the ailerons connected to said ailerons, extending through said tubular supporting members and attached to the second antifriction bearing.

7. In combination, a hollow axle, rotatable hubs mounted upon said axle, means for causing the rotation of one hub to impart reverse rotation to the other hub, hollow shafts rotatably mounted in said hubs, means for rotating said shafts, a blade mounted on each shaft, an aileron mounted on each blade, an antifriction bearing for each hub mounted within said axle, a universal joint arranged in the axle between said bearings, a stick extending through said bearings and said joint and adapted to move one of said bearings away from the axis of the axle in one direction and to simultaneously move the other bearing away from the axis of the axle in a diametrically opposite direction, and connecting means attached to said bearings, extending through said shafts and connected to said ailerons for controlling the movement of said ailerons by said stick.

In testimony whereof I have signed my name to this specification.

RAUL PATERAS PESCARA.

Witnesses:
ENSEBIO GARCIA,
JOSE SALAZ.